United States Patent
Satonaga et al.

(10) Patent No.: US 8,219,231 B2
(45) Date of Patent: Jul. 10, 2012

(54) QUALITY CONTROL SYSTEM, QUALITY CONTROL APPARATUS, QUALITY CONTROL METHOD AND COMPUTER READABLE MEDIUM

(75) Inventors: Tetsuichi Satonaga, Ashigarakami-gun (JP); Masayasu Takano, Ebina (JP); Noriyuki Matsuda, Ebina (JP); Akiko Seta, Ebina (JP); Koji Adachi, Ashigarakami-gun (JP); Kaoru Yasukawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 353 days.

(21) Appl. No.: 12/558,659

(22) Filed: Sep. 14, 2009

(65) Prior Publication Data
US 2010/0198387 A1     Aug. 5, 2010

(30) Foreign Application Priority Data
Feb. 4, 2009  (JP) .................................. 2009-023812

(51) Int. Cl.
*G06F 19/00*  (2011.01)
*G01N 37/00*  (2006.01)
*G21C 17/00*  (2006.01)
*G06F 11/30*  (2006.01)

(52) U.S. Cl. .......... 700/109; 700/96; 700/104; 700/106; 700/108; 700/110; 702/84; 702/185

(58) Field of Classification Search .............. 700/95–96, 700/99, 104–106, 108–110; 702/84, 185
See application file for complete search history.

(56) References Cited

U.S. PATENT DOCUMENTS

| | | | |
|---|---|---|---|
| 5,596,712 A * | 1/1997 | Tsuyama et al. ................. | 714/26 |
| 6,009,246 A * | 12/1999 | Chandra et al. ................. | 714/26 |
| 6,336,078 B1 * | 1/2002 | Sakayori et al. ................. | 702/81 |
| 6,343,236 B1 * | 1/2002 | Gibson et al. ..................... | 700/79 |
| 6,704,015 B1 * | 3/2004 | Bovarnick et al. ......... | 345/440.2 |
| 6,751,574 B2 * | 6/2004 | Shinohara ...................... | 702/179 |
| 6,757,578 B1 * | 6/2004 | Jang ............................. | 700/100 |
| 6,772,046 B1 * | 8/2004 | Lee et al. ...................... | 700/214 |
| 6,801,822 B1 * | 10/2004 | Fujiwara et al. .............. | 700/108 |
| 6,859,675 B1 * | 2/2005 | Kim .............................. | 700/108 |
| 6,922,656 B2 * | 7/2005 | Butler et al. .................. | 702/183 |
| 7,079,911 B2 * | 7/2006 | Gallu et al. ................... | 700/109 |
| 7,123,980 B2 * | 10/2006 | Funk et al. ..................... | 700/121 |
| 7,707,058 B2 * | 4/2010 | Suermondt et al. .......... | 705/7.25 |
| 2004/0068341 A1 * | 4/2004 | Minucciani et al. .......... | 700/110 |
| 2006/0036345 A1 * | 2/2006 | Cao et al. ...................... | 700/108 |
| 2006/0149407 A1 * | 7/2006 | Markham et al. ............. | 700/108 |
| 2006/0184264 A1 * | 8/2006 | Willis et al. ................... | 700/108 |
| 2008/0188974 A1 * | 8/2008 | Knipfer et al. ................ | 700/110 |
| 2010/0225961 A1 * | 9/2010 | Matsuda et al. .............. | 358/1.15 |

FOREIGN PATENT DOCUMENTS

| | | | |
|---|---|---|---|
| JP | 5-165853 A | 7/1993 | |
| JP | 10-217048 A | 8/1998 | |

* cited by examiner

*Primary Examiner* — Ramesh Patel
(74) *Attorney, Agent, or Firm* — Sughrue Mion, PLLC

(57) ABSTRACT

A quality control method includes: extracting, from a time series distribution of troubles that have occurred in electronic equipments, a first characteristics of states of occurrence of the troubles; specifying one or more parts included in the electronic equipments, the parts being involved with the troubles; extracting, from another time series distribution of a rate of use corresponding to each of suppliers which supply the specified parts, a second characteristics of the parts; and specifying one or more of the suppliers supplying the parts correlated to the troubles based on a correlation between the extracted first characteristics and the extracted second characteristics.

4 Claims, 8 Drawing Sheets

FIG. 4

| TROUBLE CONTENTS (401) | LIST OF INVOLVED PARTS (402) |
|---|---|
| TROUBLE A | PART X |
|  | PART Y |
| TROUBLE B | PART K |
|  | PART L |
|  | PART M |
|  | ... |
| ⋮ | ⋮ |

FIG. 6A

| CHANGE POINT EXTRACTION TROUBLE | INVOLVED LOT | CHANGE AMOUNT OF USE RATE |
|---|---|---|
| TROUBLE A | LOT X1 | -32% |
| | LOT X2 | 40% |
| | LOT X3 | 2% |

FIG. 6B

| CHANGE POINT EXTRACTION TROUBLE | INVOLVED LOT | CHANGE AMOUNT OF USE RATE |
|---|---|---|
| TROUBLE A | LOT Y1 | 2% |
| | LOT Y2 | -3% |

FIG. 7

| INVOLVED LOT | CHANGE AMOUNT OF USE RATE |
|---|---|
| LOT X1 | -32% |
| LOT X2 | 40% |

QUALITY CONTROL SYSTEM, QUALITY CONTROL APPARATUS, QUALITY CONTROL METHOD AND COMPUTER READABLE MEDIUM

CROSS-REFERENCE TO RELATED APPLICATIONS

This application is based on and claims priority under 35 USC 119 from Japanese Patent Application No. 2009-023812 filed on Feb. 4, 2009.

BACKGROUND

1. Technical Field

The present invention relates to a quality control system, a quality control apparatus, a quality control method and a computer readable medium.

2. Related Art

With the sophistication and complication of technology, functions to be incorporated into a product such as an image forming apparatus as well as parts therein realizing such functions tend to increase, and the parts are linked with each other to carry out the processings of the product. Since these parts are required to have high precision and enhancement in the production efficiency thereof, they are manufactured in multiple enterprises and factories.

Therefore, when a problem such as poor operation in the product occurs, it is difficult to specify the part that has caused the problem and thus the parts are required to be checked one by one, which takes a lot of time to analyze the problem.

SUMMARY

According to an aspect of the invention, a quality control apparatus, includes: a first extracting unit that extracts, from a time series distribution of troubles that have occurred in electronic equipments, a first characteristics of states of occurrence of the troubles; a part specifying unit that specifies one or more parts included in the electronic equipments, the parts being involved with the troubles; a second extracting unit that extracts, from another time series distribution of a rate of use corresponding to each of suppliers which supply the parts specified by the part specifying unit, a second characteristics of the parts; and a part supplier specifying unit that specifies one or more of the suppliers supplying the parts correlated to the troubles based on a correlation between the first characteristics extracted by the first extracting unit and the second characteristics extracted by the second extracting unit.

BRIEF DESCRIPTION OF THE DRAWINGS

Exemplary embodiment(s) of the present invention will be described in detail based on the following figures, wherein:

FIG. 4 is a table of an example of the mutual correspondence between trouble contents and parts involved with the trouble contents;

FIGS. 6A and 6B are tables of examples of change amounts respectively occurring in the respective manufacturing lines of parts involved with troubles;

FIG. 7 is a table of an example of trouble related information;

DETAILED DESCRIPTION

Now, description will be given below in detail of an exemplary embodiment of a quality control system, a quality control apparatus and a quality control program according to the invention with reference to the accompanying drawings.

Arbitrary electronic equipment is made of one or more parts, or, it is made of one or more processing units each including such two or more parts. An image forming apparatus, which is an example of such electronic equipment, includes not only processing units such as a print processing device, an image read device and an information communicating device but also a common mechanism to be used in common between these processing units.

Of the above processing units, the print processing device is made of various kinds of multiple parts such as an information processing circuit, a sensitive body, a convey roller and a developing unit, or it is made of a unit which includes necessary parts.

Thus, in the electronic equipment, multiple parts or multiple units are combined together and processings are carried out in such a manner that they are linked with each other.

Example

Figure 1:
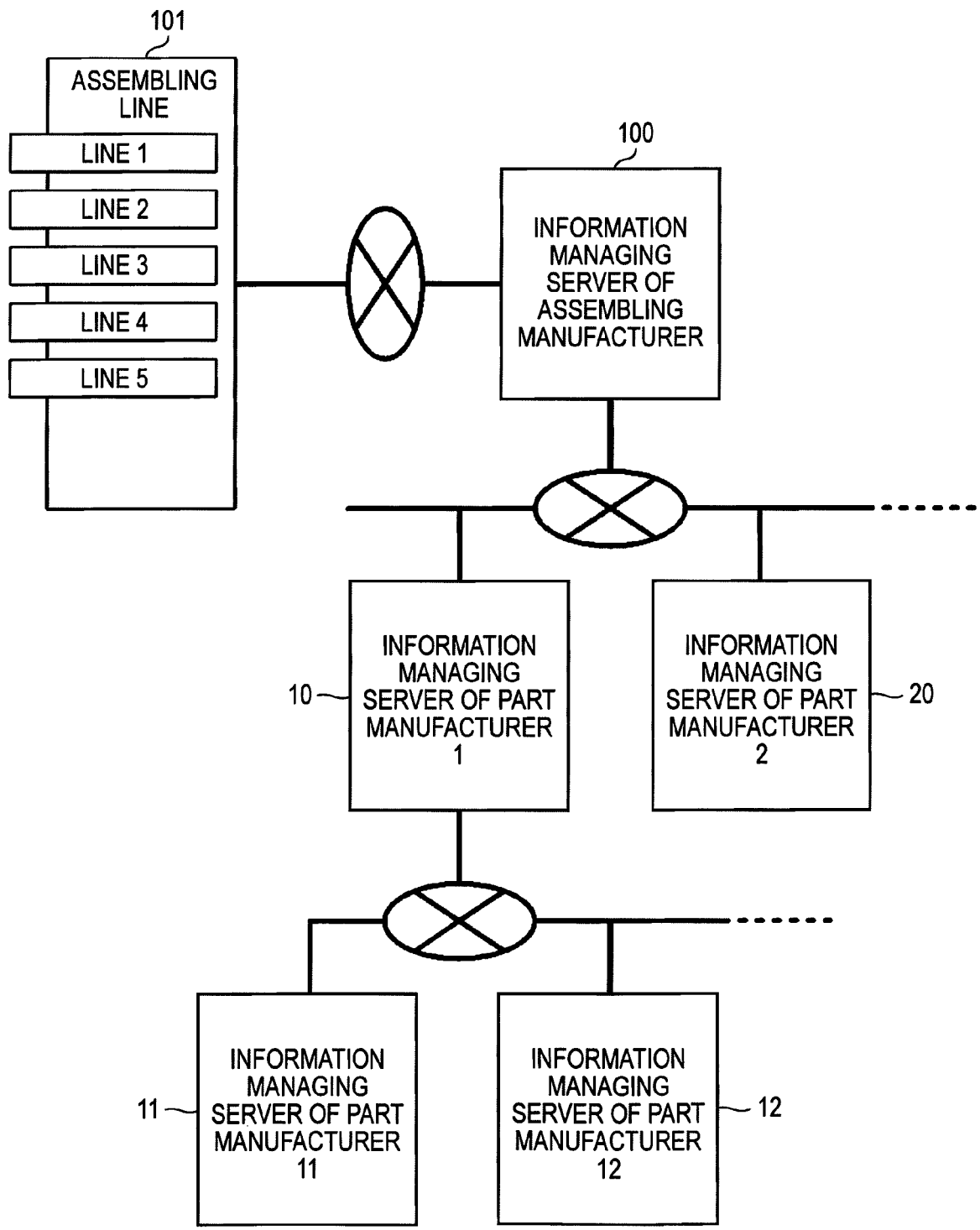
FIG. 1 is a structure view of an example of a quality control system structured by applying a quality control system, a quality control apparatus and a quality control program respectively according to an exemplary embodiment of the invention.

FIG. 1 is an example of a system structure view of a quality control system structured by applying a quality control system, a quality control apparatus and a quality control program respectively according to the exemplary embodiment of the invention.

In the present quality control system shown FIG. 1, segments such as production lines or factories or companies for manufacturing and assembling parts or parts units for constituting a certain piece of electronic equipment respectively constitute nodes in a hierarchical structure according to the manufacturing steps and the like of the electronic equipment; and in each of the segments, not only parts information about parts manufactured or parts used but also manufacture information about materials used in manufacturing the parts, manufacturing conditions, operators, facilities used and the like are managed by an information managing server.

This hierarchical structure is formed depending on the relationship between the information managing servers of the respective segments.

The quality control system shown in FIG. 1 has a structure including three hierarchies. As the node of the most significant hierarchy, there is set the information managing server 100 of an assembling maker; as the nodes of the subordinate hierarchy of the most significant hierarchy, there are set the information managing server 10 of a part manufacturer 1 and the information managing server 20 of a part manufacturer 2; and, as the subordinate hierarchy nodes of the information managing server 10 of the part manufacturer 1, there are set the information managing server 11 of a part manufacturer 11 and the information managing server 12 of a part manufacturer 12.

Further, the information managing server 100 of the assembling manufacturer is connected to an assembling line for carrying out an assembling processing. Thus, the information managing server 100 manages manufacture information about the manufacture of the electronic equipment including part information about parts assembled together as well as trouble part information about the troubles or failures of parts found in the assembling line.

Other information managing servers (information managing server 10, information managing server 20, information managing server 11, and information managing server 12) (which are hereinafter generically called [information managing server] simply), which are disposed in the subordinate hierarchies of the information managing server 100 of the assembling manufacturer, respectively manage the manufacture information including part information about parts used in the segments of the respective hierarchies or about parts manufactured there as well as trouble part information about troubles found in such parts.

That is, the information managing servers of the respective hierarchies manage the manufacture information about the parts.

Figure 2:
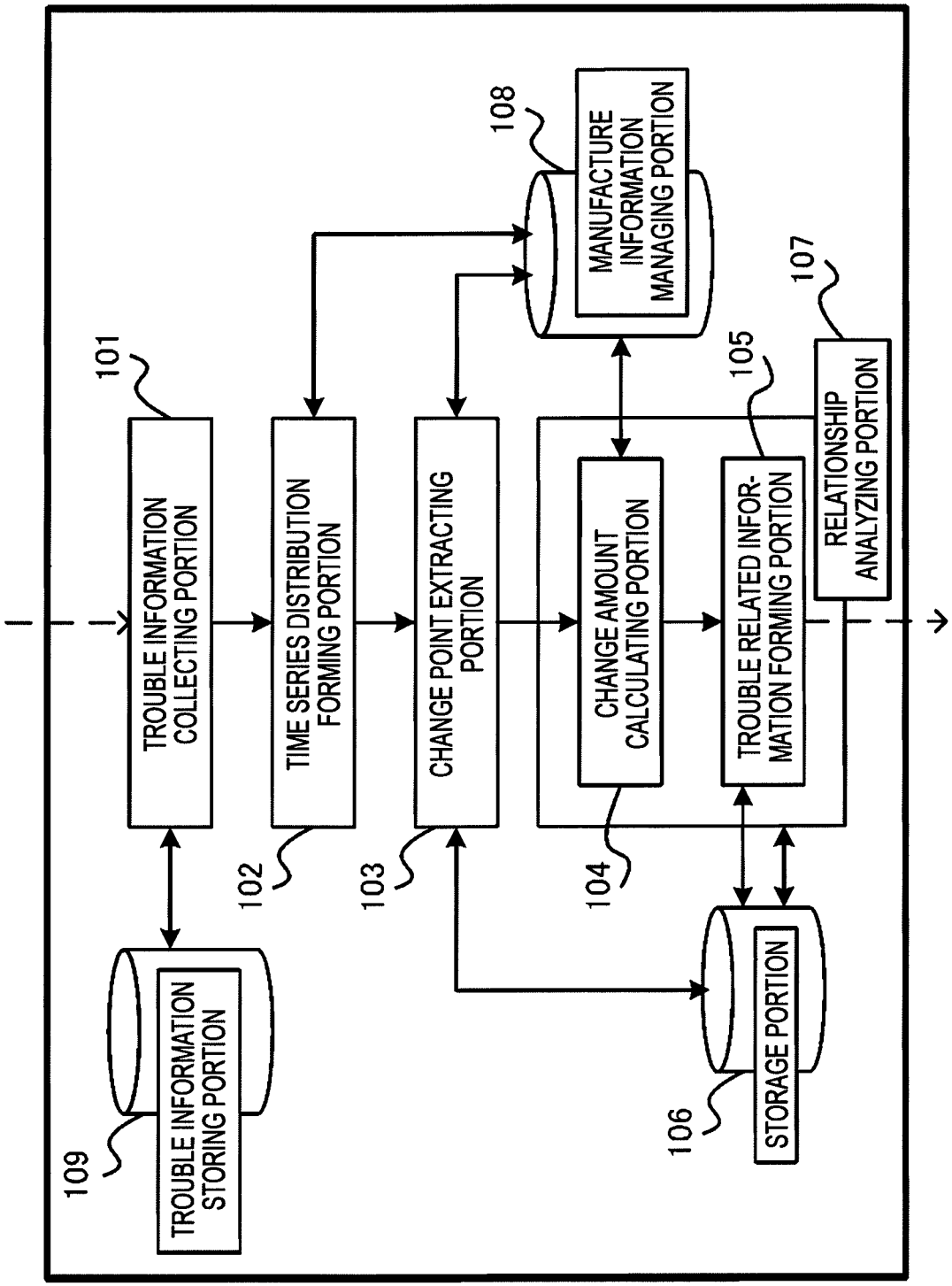
FIG. 2 is a block diagram of an example of the detailed structure of an information management server.

FIG. 2 shows a detailed structure of an information managing server in the above case.

The information managing server shown in FIG. 2 includes a trouble information collecting portion 101, a time series distribution forming portion 102, a change point extracting portion 103, a change amount calculating portion 104, a trouble related information forming portion 105, a storage portion 106, a relationship analyzing portion 107, a manufacture information managing portion 108, and a trouble information storing portion 109.

When trouble information relating to a trouble occurred in a certain piece of electronic equipment is received or such trouble information is input by a manager, the trouble information collecting portion 101 not only analyzes the contents of the trouble according to the trouble information but also, according to other piece of trouble information stored in the trouble information storing portion 109, classifies the analyzed trouble contents into a group of the same or similar trouble contents and stores them as the related trouble information.

When the troubles in the trouble information at the then time are shown by error numbers respectively, the trouble shown by the error number is classified according to a trouble error group code; or, when the trouble information is shown by a character string, the trouble is classified according to a keyword searched by a keyword search.

When troubles are classified into a group of the same or similar troubles according to the contents of the troubles, the trouble information collecting portion 101 demands the time series distribution forming portion 102 to form the time series distribution of the occurrence rates of the classified trouble contents ("trouble occurrence rates") and also the time series distribution of the use rates concerning parts involved with the trouble contents ("part use rates").

On receiving the time series distribution forming demand from the trouble information collecting portion 101, the time series distribution forming portion 102, firstly, according to trouble contents which are the same as or similar to the trouble contents classified by the trouble information collecting portion 101, forms the occurrence rates of the trouble contents in a time series manner.

Figure 3:
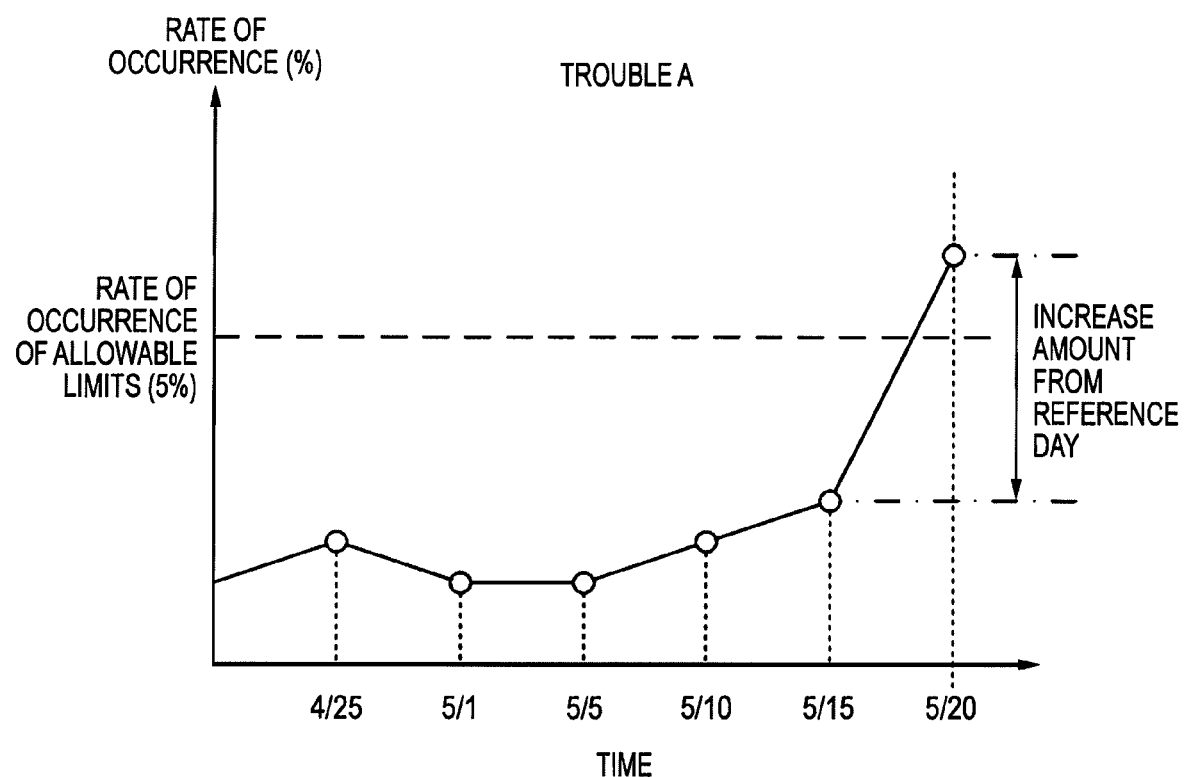
FIG. 3 is a graphical representation of an example of the time series distribution of the rate of occurrence of troubles.

FIG. 3 shows an example of a distribution of the occurrence rates of the trouble contents in the above case.

FIG. 3 is a time series distribution view in which the time passage is shown by the horizontal axis, while the occurrence rates of the trouble contents are shown by the vertical axis. In FIG. 3, there is shown a distribution of the trouble occurrence rates of "troubles A" which occurred on the "manufactured day" of the electronic equipment.

The distribution view illustrated in FIG. 3 shows that the trouble occurrence rate on "May 20" increases suddenly with respect to the trouble occurrence rate on "May 15", and also shows that the trouble occurrence rate on "May 20" exceeds a given trouble occurrence rate (an allowable limit trouble occurrence rate=5%). Also, the distribution view further shows that the increase rate of the trouble occurrence rates on "May 20" is equal to or larger than a given increase rate from the trouble occurrence rate on the reference day (for example, "May 15".

Figure 5A:
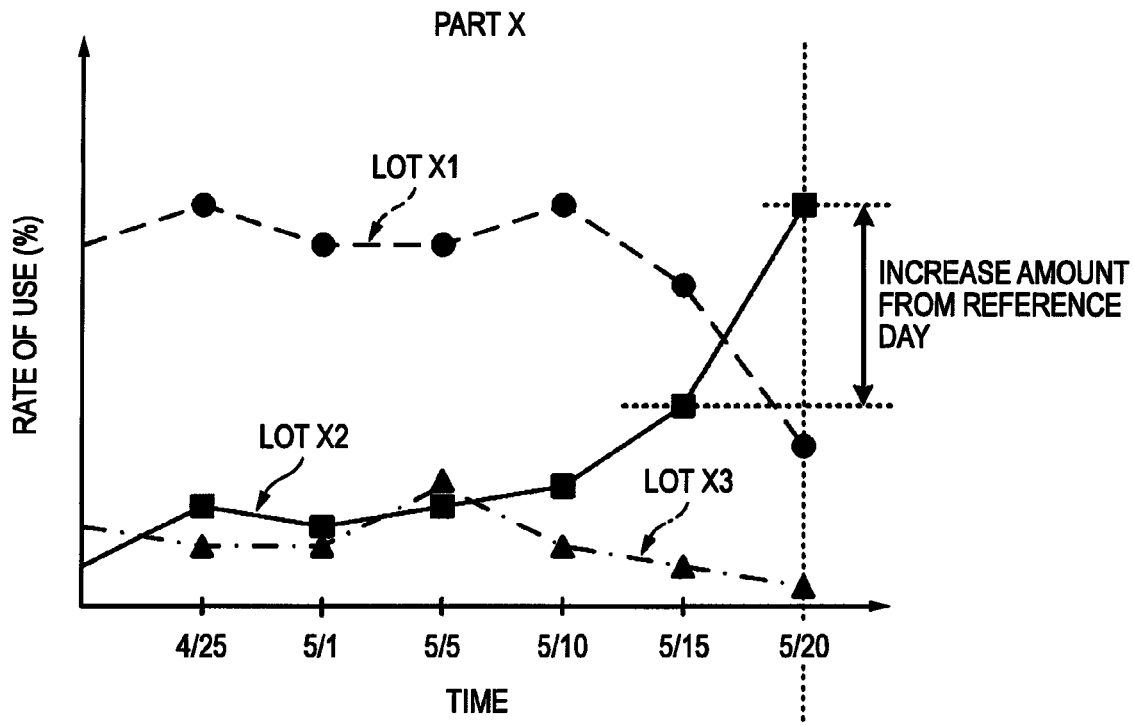
FIGS. 5A and 5B are graphical representations of examples of the time series distribution of the part use rate.
Figure 5B:
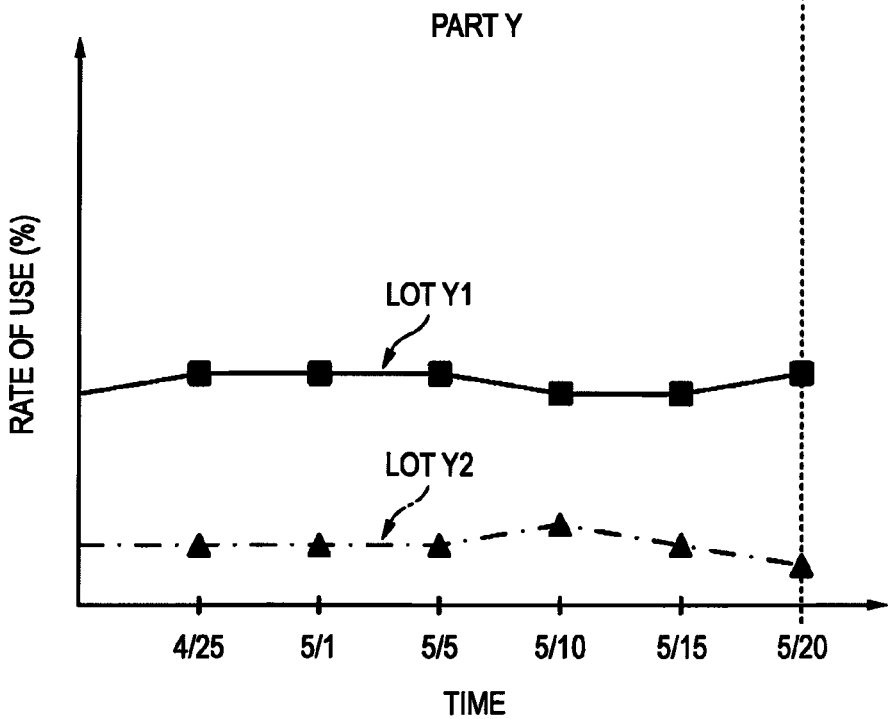

The time series distribution forming portion 102, which has formed such time series distribution of the rates of occurrences of the contents of the troubles, next, forms such a time series distribution of the use rate concerning parts involved with the contents of the troubles as shown in FIGS. 5A and 5B.

Figure 4:
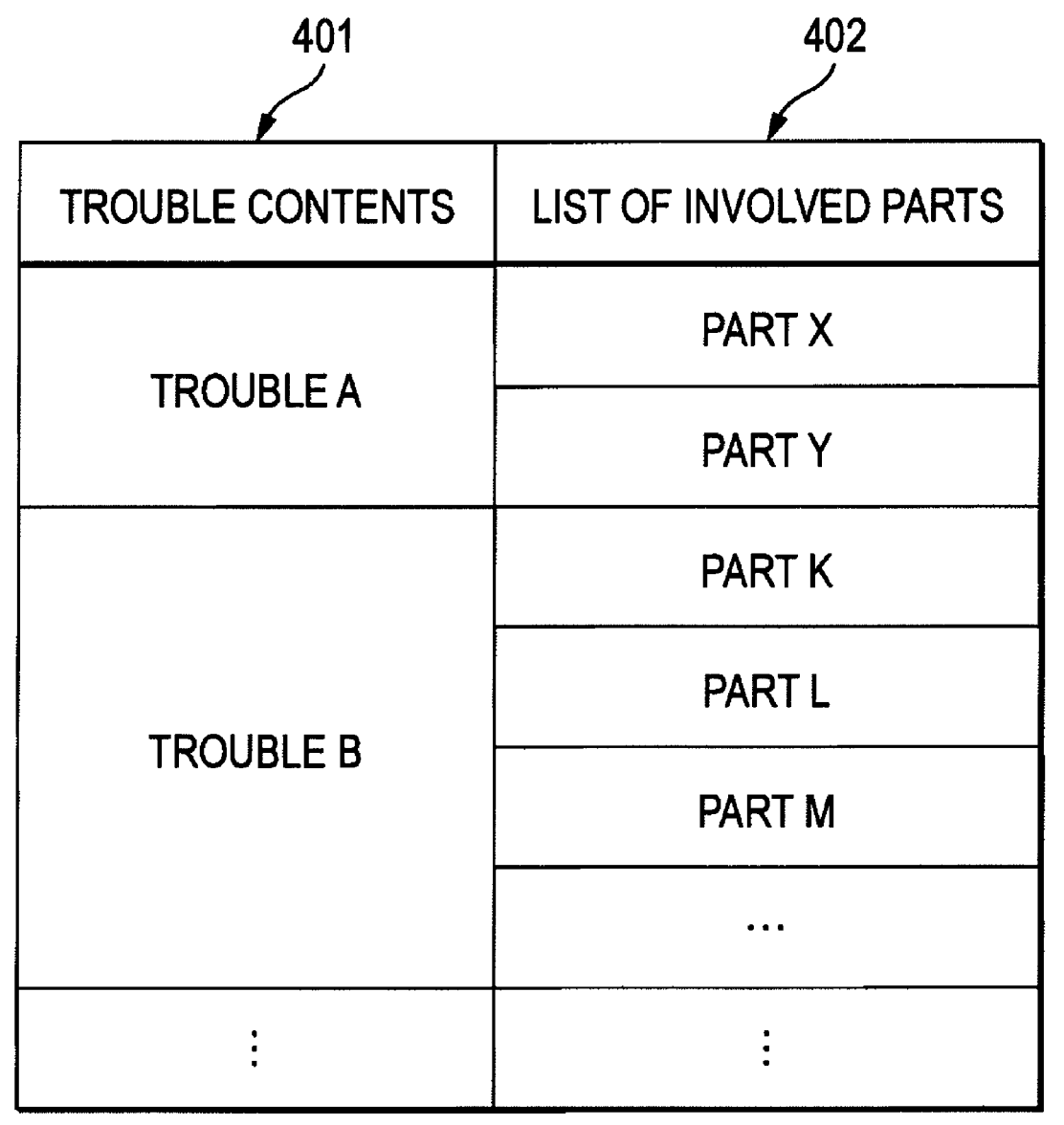

In this case, the time series distribution forming portion 102 refers to such a correspondence table between trouble contents and parts involved with the trouble contents as shown in FIG. 4 to obtain information about parts involved with troubles having occurred (in the example shown in FIG. 3, the "trouble A") from the manufacture information managing portion 108.

In FIG. 4, there is shown a correspondence table between trouble contents and parts involved with the trouble contents; and, the correspondence table of FIG. 4 includes a "trouble content" item 401 revealing the contents of troubles having occurred, and a "list of parts involved" item 402 revealing parts involved with the trouble contents shown in the "trouble content" item 401.

For example, when the "trouble content" item 401 corresponds to the "trouble A", the parts involved are shown in the "list of parts involved" item 402, thereby revealing that the parts are a "part X" and a "part Y".

Also, it is shown that the parts involved with the "trouble B" are a "part K", a "part L", a "part M" and the like.

From this correspondence table, as the parts involved with the "trouble A", there are specified a "part X" and a "part Y" and thus, information about these parts is obtained from the manufacture information managing portion 108.

When there are specified the parts involved with the trouble contents having occurred in this manner, the time series distribution forming portion 102, next, according to the information about the parts obtained from the manufacture information managing portion 108, forms a distribution view in which, for the respective parts, the rates of use of respective manufacturing lines where they were manufactured are distributed in a time series manner.

The manufacturing lines for manufacturing the parts are set in the respective segments shown in FIG. 1 and are used to manufacture and assemble the parts. The manufacturing lines are also designated as "lots".

Examples of the time series distribution views formed in this manner are shown in FIGS. 5A and 5B.

FIGS. 5A and 5B are views where the use rates concerning the "part X" and "part Y", which are parts involved when the "trouble A" has occurred, are shown in the respective lots such as the manufacturing lines.

FIG. 5A is a view of distribution of the use rates of the respective manufacturing lines for manufacturing the "part X". FIG. 5B is a view of distribution of use rates of the respective manufacturing lines for manufacturing the "part Y".

FIG. 5A shows that the "part X" is manufactured in three manufacturing lines (that is, a lot X1, a lot X2, and a lot X3), while the use rates of the respective manufacturing lines for the "part Y" are shown by their manufacturing days.

The rate of use in FIG. 5A shows that, at the time of May 10, the parts X manufactured in the lot X1 are used more than the parts X manufactured in the lots X2 and X3 for manufacturing the electronic equipments; however, FIG. 5A also shows that, at the time of May 15, the difference between the use rate of the lot X1 for manufacturing the parts X and the use rate of the lot X2 for manufacturing the parts X is smaller than the difference at the time of May 10.

Further, FIG. 5A shows that, at the time of May 20, an increase rate from the reference day (in FIG. 5A, May 15) is a given rate or higher, whereby the use rate of the lot X2 for manufacturing the parts X is higher than that of the lot X1 for manufacturing the parts X.

Here, FIG. 5A shows that, at the time of May 20, the use rate of the parts X manufactured in the lot X3 tends to decrease, although slightly, when compared with the use rate thereof at the time of May 10.

On the other hand, FIG. 5B shows that the parts Y are manufactured in the two manufacturing lines (that is, lot Y1 and lot Y2) and, specifically, it shows that the use rates of the respective manufacturing lines for manufacturing the parts Y are shown by their manufacturing days. FIG. 5B also shows that the use rates of the respective manufacturing lines for manufacturing the parts Y continue substantially constantly although they vary slightly.

In this manner, the time series distribution forming portion 102 forms the time series distribution of the use rates concerning the parts involved with the trouble contents for the respective manufacturing lines.

After the time series distribution forming portion 102 forms these time series distribution views, time series distribution forming portion 102 demands the change point extracting portion 103 to extract change points in the time series distribution views. On receiving the extraction demand, the change point extracting portion 103 extracts change points according to the time series distribution views respectively shown in FIGS. 3 and 5.

The change point is a point at which the number of trouble occurrences increases at a given rate or higher or provides a given rate of occurrence and also which characterizes the states of the trouble occurrences; however, actually, the change point is shown by a given range.

In the time series distribution view shown in FIG. 3, the time, when the occurrence of troubles exceeding the allowable limit occurrence rate (5%) set as a given value and an increase rate from the reference day reaching and exceeding a given rate are detected, is May 20; and, therefore, the change point of the trouble occurrence rate is extracted as "May 15~May 20".

Here, although, in the above-mentioned example using FIG. 3, as the change point, there is shown a point where the number of trouble occurrences increases at a given rate or higher and also exceeds a given value (allowable limit occurrence rate), actually, a point satisfying at least one of these two conditions is extracted as the change point.

Also, referring to the time series distribution view shown in FIG. 5A, FIG. 5A shows that the use rate of the lot X2 for manufacturing the parts X increases at a given rate or higher from the reference day (in FIG. 5A, May 15); and, FIG. 5A also shows that the use rate of the part X manufactured in the lot X1 decreases at a given rate or higher from the reference day (in FIG. 5A, May 15).

On the other hand, from FIG. 5B, it can be determined that no change of a given rate or higher is found.

Due to this, in the change point extracting portion 103, the change point of the use rate concerning the part X is extracted in the form of May 15~May 20.

Figure 8:
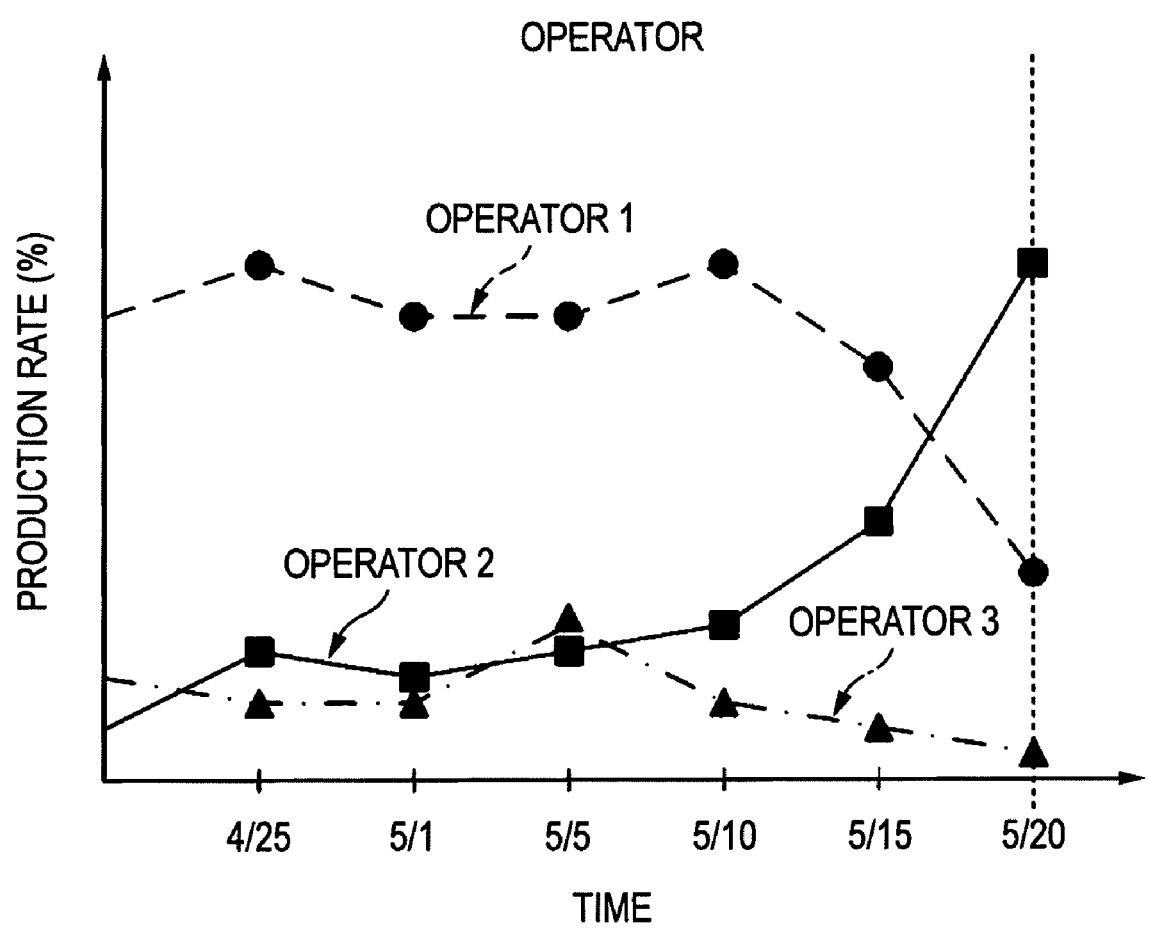
FIG. 8 is a graphical representation of another example of the time series distribution of the part use rate.

Here, in FIGS. 5A and 5B, the use rates the respective manufacturing lines for the parts are distributed in a time series manner. Besides this, there may also be employed a structure in which, as shown in FIG. 8, the rates of manufacture by the respective operators involved with the manufacture of parts are distributed in a time series manner and, using such time series distribution view, the change point can be extracted. Here, in the time series distribution shown in FIG. 8, the rates of production concerning an operator 1 and an operator 2 vary at a given rate or higher between May 15 and May 20; and, therefore, as the change point, there is extracted the range of May 15~May 20.

When the change point extracting portion 103 extracts the respective change points in this manner, the change point extracting portion 103 sends information about these change points and information about the use rates concerning the parts in the change points to the change amount calculating portion 104 of the relationship analyzing portion 107. Here, when the change points cannot be extracted by the change point extracting portion 103, the change point extracting portion 103 informs the change amount calculating portion 104 of this effect.

When the change amount calculating portion 104 receives the information about the change points, and also even when the change points cannot be extracted, the change rate calculating portion 104 calculates the change amount (change rate) of the use rates in the change points extracted by the change amount calculating portion 104. FIGS. 6A and 6B show the thus calculated change amounts by the respective manufacturing lines (lots) at the then time.

FIGS. 6A and 6B are view in which, when troubles having occurred belong to the "trouble A", the change amounts of the parts X and Y involved with the "trouble A" in their respective manufacturing lines (lots) are shown.

FIG. 6A shows the change amounts of the part use rates concerning the "parts X" in the change points; and FIG. 6A includes a "change point extraction trouble" item 601, an "involved lot" item 602 and a "change amount of use rate" item 603.

The "change point extraction trouble" item 601 shows the content of the trouble and, specifically, as the trouble that has occurred, there is shown the "trouble A". The "involved lot" item 602 shows the information about the "part X" manufacturing lines involved with the "trouble A" shown in the "change point extraction trouble" item 601; and, specifically, it shows that the "parts X" are manufactured in the "lot X1", "lot X2" and "lot X3". Also, the change amount of use rate" item 603 shows the change amounts in the change points, that is, the increase or decrease rates. Specifically, the change amount of use rate" item 603 shows that, for the "parts X" manufactured in the "lot X1", the increase or decrease rate in the change point thereof is −32%; for the "parts X" manufactured in the "lot X2", the increase or decrease rate in the change point thereof is +40%; and, for the "parts X" manufactured in the "lot X3", the increase or decrease rate in the change point thereof is +2%.

On the other hand, FIG. 6B shows the change amounts of the part use rates of the "parts Y" in the change points thereof;

and, FIG. 6B, similarly to FIG. 6A, includes a "change point extraction trouble" item 601, an "involved lot" item 602 and a "change amount of use rate" item 603.

In the "change point extraction trouble" item 601, as the trouble that has occurred, there is shown the "trouble A"; and, in the "involved lot item 602", as the manufacturing lines of the "parts Y", there are shown a "lot Y1" and a "lot Y2". Also, the change amount of use rate" item 603 shows that the increase or decrease rate in the change points of the "parts Y" manufactured in the "lot Y1" is +2%, and the increase or decrease rate in the change points of the "parts Y" manufactured in the "lot Y2" is −3%.

The change rate calculating portion 104 informs the trouble related information forming portion 105 of information about the change amounts of the part use rates in the change points calculated in the change amount calculating portion 104.

The trouble related information forming portion 105, from the information about the change amounts calculated by the change amount calculating portion 104, forms trouble related information serving as information (in the above example, the lots representing the manufacturing lines) that is determined to be related to the cause of the trouble.

The trouble related information is, for example, such information as shown in FIG. 7. The trouble related information shown in FIG. 7 designates information about a manufacturing line of a given threshold value or more, of the change amounts of the part use rates of the parts in the change point thereof.

FIG. 7 includes an "involved lot" item 701 and a "change amount of use rate" item 702, while FIG. 7 shows information about a manufacturing line (lot) in which the change amount of the use rates of the parts exceeds the threshold value of 7%.

In the "change amount of use rate" item 702, there are shown, as the change amounts, −32% and +40% respectively. And, in the "involved lot" item 701, there are shown, as the manufacturing lines, the "lot X1 and lot X2" respectively.

When the trouble information including such information is formed by the trouble related information forming portion 105, the thus formed trouble information is stored into the storage portion 106. Here, when the trouble information is formed in the trouble related information forming portion 105 and is stored into the storage portion 106, the relationship analyzing portion 107 obtains information for specifying the segments of the manufacturing lines (in the above-mentioned example, the "lot X1" and "lot X2") specified by the trouble information, and then transmits the trouble information based on the thus obtained information.

The segments are, as shown in FIG. 1, parts manufacturers and the like (that is, for the side for transmitting the trouble information, the nodes of the subordinate hierarchies) Thus, the information about the trouble is transmitted to the information managing servers of the above-specified segments.

And, the information managing server, who has received the information about the trouble, specifies the segments of the further subordinate hierarchies involved with the trouble according to the information about the trouble, and transmits the information about the trouble to the information managing servers of the specified segments.

For example, suppose the part manufacturer 1 of the part X is manufacturing the part X using a part a (which is manufactured by the part manufacturer 11) and a part b (which is manufactured by the part manufacturer 12), when the information managing server 10 of the part manufacturer 1 receives information about the part X from the information managing server 100 of the assembling manufacturer, it specifies the factors of the trouble according to the thus received information.

Here, when it is specified that the trouble is caused by the part a, the information managing server 10 of the part manufacturer 1 transmits the information about the trouble to the information managing server 11 of the part manufacturer 11. Also, when parts a respectively manufactured by different manufacturers are used according to the lots of the part X, the information managing server 10 of the part manufacturer 1 specifies the lot that has caused the trouble, and then it specifies the manufacturer of the part a used in the specified lot.

Figure 9:
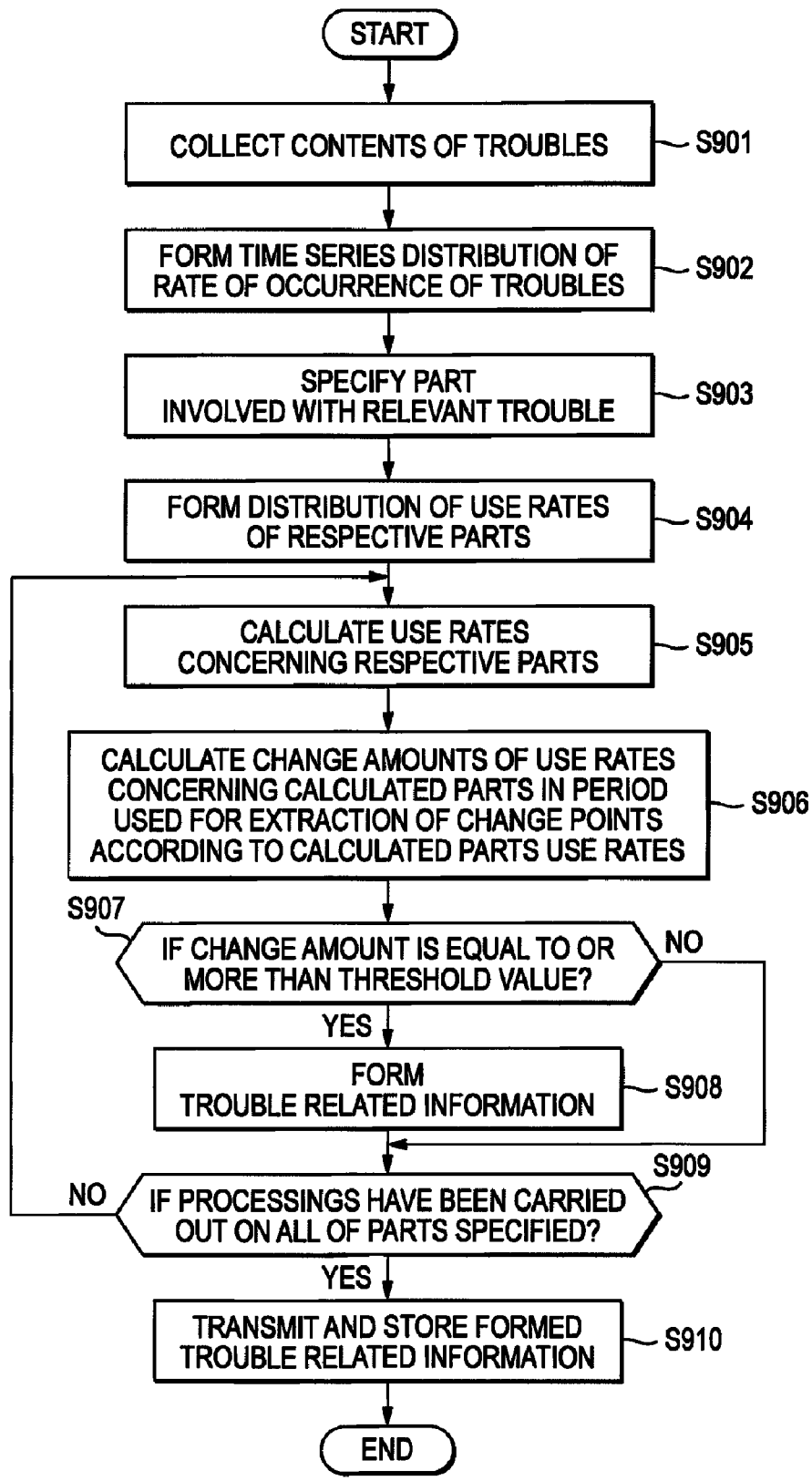
FIG. 9 is a flow chart of an example of the flow of processing to be carried out by the information managing servers of a quality control system according to the exemplary embodiment of the invention.

FIG. 9 is a flow chart to show the flow of the processings that are carried out by the information managing servers of a control system according to the exemplary embodiment of the invention.

In FIG. 9, when the information managing server receives information showing the occurrence of a trouble, it starts the processing thereof and also, based on the other pieces of trouble information, it classifies the contents of the analyzed troubles into a group of the same or similar trouble contents and adds them up (S901).

And, the distribution of the rates of occurrence of the contents of the classified and totaled troubles is formed in a time series manner (S902). Next, a part involved with the trouble content is specified (S903), and there are formed such time series distributions of the use rates of the respective parts as shown in FIGS. 5A and 5B (S904).

The rates of use of the respective parts are calculated from the thus formed time series distributions of the part use rates (S905) and, based on the calculated use rates of the respective parts, there are calculated the change amounts of the use rates in a period of time which is used for extraction of the above-mentioned change points (S906).

It is checked whether the change amount is equal to or larger than a threshold value (S907). When the change amount is found equal to or larger than a threshold value (in S907, Yes), there is formed trouble related information including information for specifying such manufacturing lines (lots) of a part as shown in FIG. 7 the change amount of which is equal to or larger than a threshold value (S908).

When the change amount is found not equal to or larger than a threshold value (in S907, No), or after the processing of S908 is carried out, it is checked whether the processings of S905 to S908 have been carried out on all of parts specified (S909). When it is found that the processings have not been carried out on all of the parts (in S909, No), these processings are carried out on such parts. Also, when it is found that the processings have been carried out on all of the parts (in S909, Yes), the formed trouble related information is transmitted to the information managing server of a segment in charge of the manufacturing line for manufacturing a part the change amount of the use rate of which contained in such trouble related information is equal to or larger than a threshold value (S910).

Here, the invention can also execute the above-mentioned operations using a quality control system having a communication function, or can structure a quality control system which, from a recording medium (CD-ROM, DVD-ROM or the like) for storing therein a program for structuring the above-mentioned units, installs the program into a computer and allows the computer to execute the program to thereby executes the above-mentioned processings. To the computer constituting the quality control system, there are connected a CPU (Central Processor Unit), a ROM (Read Only Memory), a RAM (Random Access Memory), and a hard disk. The CPU executes its processing using the RAM as its operation area according to a program stored in the ROM or hard disk.

Also, a medium for supplying a program may also be a communication medium (a medium such as a communication line or a communication system which holds a program temporarily or in a fluid manner). For example, the program may also be put up on the BBS (Bulletin Board Service) of the communication network and distribute it through a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A quality control apparatus, comprising:
a first extracting unit that extracts, from a first time series distribution of defects that have occurred in manufacturing electronic equipment, a time period at which a rate of manufacturing defect increases by a first predetermined percentage and a percentage of the manufacturing defect exceeds a second predetermined percentage;
a part specifying unit that specifies a component of the electronic equipment involved with the manufacturing defect;
a second extracting unit that extracts, from a second time series distribution of a rate of use of the component for each of suppliers which supply the component specified by the part specifying unit, a change of the rate of use of the component in the manufacturing equipment for each of the suppliers; and
a part supplier specifying unit that specifies one or more of the suppliers as a source of the manufacturing defect if the change of the rate of use of the component in the manufacturing equipment for said one or more of the suppliers during the extracted time period exceeds a third predetermined percentage,
wherein the electronic equipment comprises a print processing device and the component comprises one of an information processing circuit, a convey roller, and a developing unit.

2. A quality control system, comprising:
two or more quality control apparatuses,
wherein each quality control apparatus comprises:
a first extracting unit that extracts, from a first time series distribution of defects that have occurred in manufacturing electronic equipment, a time period at which a rate of manufacturing defect increases by a first predetermined percentage and a percentage of the manufacturing defect exceeds a second predetermined percentage;
a part specifying unit that specifies a component of the electronic equipment involved with the manufacturing defect;
a second extracting unit that extracts, from second time series distribution of a rate of use of the component for each of suppliers which supply the component specified by the part specifying unit, a change of the rate of use of the component in the manufacturing equipment for each of the suppliers; and
a part supplier specifying unit that specifies one or more of the suppliers as a source of the manufacturing defect if the change of the rate of use of the component in the manufacturing equipment for said one or more of the suppliers during the extracted time period exceeds a third predetermined percentage,
wherein the quality control apparatuses form a hierarchical structure respectively,
wherein the quality control apparatus at a superior hierarchy transmits information about the source of the manufacturing defect to the quality control apparatus of the suppliers of the component at a subordinate hierarchy, and
wherein the electronic equipment comprises a print processing device and the component comprises one of an information processing circuit, a convey roller, and a developing unit.

3. A quality control method comprising:
extracting, from a first time series distribution of defects that have occurred in manufacturing electronic equipment, a time period at which a rate of manufacturing defect increases by a first predetermined percentage and a percentage of the manufacturing defect exceeds a second predetermined percentage;
specifying a component of the electronic equipment involved with the manufacturing defect;
extracting, from s second time series distribution of a rate of use of the component for each of suppliers which supply the specified component, a change of the rate of use of the component in the manufacturing equipment for each of the suppliers; and
specifying one or more of the suppliers as a source of the manufacturing defect if the change of the rate of use of the component in the manufacturing equipment for said one or more of the suppliers during the extracted time period exceeds a third predetermined percentage,
wherein the electronic equipment comprises a print processing device and the component comprises one of an information processing circuit, a convey roller, and a developing unit.

4. A non-transitory computer readable medium storing a program causing a computer to execute a process for quality control, the process comprising:
extracting, from a first time series distribution of defects that have occurred in manufacturing electronic equipment, a time period at which a rate of manufacturing defect increases by a first predetermined percentage and a percentage of the manufacturing defect exceeds a second predetermined percentage;
specifying a component of the electronic equipment involved with the manufacturing defect;
extracting, from s second time series distribution of a rate of use of the component for each of suppliers which supply the specified component, a change of the rate of use of the component in the manufacturing equipment for each of the suppliers; and
specifying one or more of the suppliers as a source of the manufacturing defect if the change of the rate of use of the component in the manufacturing equipment for said one or more of the suppliers during the extracted time period exceeds a third predetermined percentage,
wherein the electronic equipment comprises a print processing device and the component comprises one of an information processing circuit, a convey roller, and a developing unit.

* * * * *